US006326338B1

(12) United States Patent
Garrett

(10) Patent No.: US 6,326,338 B1
(45) Date of Patent: Dec. 4, 2001

(54) EVAPORATIVE N-PROPYL BROMIDE-BASED MACHINING FLUID FORMULATIONS

(75) Inventor: Andrew D. Garrett, Gig Harbor, WA (US)

(73) Assignee: Garrett Services, Inc., Gig Harbor, WA (US)

( * ) Notice: Subject to any disclaimer, the term of this patent is extended or adjusted under 35 U.S.C. 154(b) by 0 days.

(21) Appl. No.: 09/603,790

(22) Filed: Jun. 26, 2000

(51) Int. Cl.$^7$ ................ C10M 105/52; C10M 111/02
(52) U.S. Cl. ................ 508/589; 508/579; 508/582; 72/42
(58) Field of Search .................. 508/582, 589, 508/579; 72/42

(56) References Cited

U.S. PATENT DOCUMENTS

| | | | |
|---|---|---|---|
| 4,239,635 | | 12/1980 | Rieder .................. 252/34 |
| 4,428,851 | * | 1/1984 | Hisamoto et al. . |
| 5,391,310 | | 2/1995 | Krueger et al. .............. 252/45 |
| 5,496,479 | | 3/1996 | Videau et al. .............. 252/49.3 |
| 5,616,549 | * | 4/1997 | Clark . |
| 5,665,170 | * | 9/1997 | Lee et al. . |
| 5,690,862 | * | 11/1997 | Moore, Jr. et al. . |
| 5,716,917 | | 2/1998 | Williams et al. .............. 508/547 |
| 5,750,488 | | 5/1998 | Haskell et al. ............... 510/412 |
| 5,824,162 | * | 10/1998 | Clark . |
| 5,858,953 | * | 1/1999 | Aman et al. . |
| 5,874,390 | | 2/1999 | Gong et al. .............. 508/273 |
| 5,938,859 | * | 8/1999 | Clark et al. . |
| 5,985,804 | | 11/1999 | Ashjian et al. .............. 508/287 |
| 6,010,997 | * | 1/2000 | Thenappan et al. . |
| 6,022,842 | * | 2/2000 | Owens et al. . |
| 6,043,201 | | 3/2000 | Milbrath et al. .............. 508/582 |
| 6,048,832 | | 4/2000 | Thenappan et al. .............. 510/410 |
| 6,048,833 | * | 4/2000 | DeGroot . |
| 6,063,749 | * | 5/2000 | DeGroot . |
| 6,103,684 | * | 8/2000 | Thenappan et al. . |
| 6,176,942 | * | 1/2001 | Clark et al. . |

FOREIGN PATENT DOCUMENTS

WO 96/36689   11/1996   (WO) .

OTHER PUBLICATIONS

"ISOPAR C Solvent Sales Specification," *Product Information Bulletin*, Exxon Company, Apr. 1, 1996.
Drozda and Wick (eds.), *Tool and Manufacturing Engineers Handbook*, 4$^{th}$ ed., Society of Manufacturing Engineers, Dearborn, Michigan, Chapter 4, "Cutting Fluids and Industrial Lubricants," vol. 1, pp. 4–1—4–11, 1983.
Nachtman, "Metal Cutting and Grinding Fluids," *Metals Handbook*, 9$^{th}$ ed., vol. 16, pp. 121–125, 1989.
"Vertrel XF,", Product Brochure, date unknown.
"Uses for Isopar Fluids," date unknown.
"Hypersolve," Product description, date unknown.
2,2,4–Trimethylpeutane product brochure, date unknown.
"3M Specialty Fluids: 3M HFE–7100," product brochure, date unknown.
"Boelube" product brochure, date unknown.
"Boelube 70105" Material Safety Data Sheet , date unknown.

* cited by examiner

*Primary Examiner*—Jerry D. Johnson
(74) *Attorney, Agent, or Firm*—Seed Intellectual Property Law Group PLLC

(57) ABSTRACT

Disclosed is a machining fluid admixture for cooling and lubricating a workpiece/tool interface, wherein the admixture comprises a major amount of n-propyl bromide and a minor amount of a lubricant. In other embodiments, the machining fluid consists essentially of about 30.0 to about 99.99 weight percent n-propyl bromide; from about 0.01 to about 30.0 weight percent of a lubricant; and optionally from 0.0 to about 70.0 weight percent of a fluorinated chemical. In still further embodiments, the machining fluid consists essentially of about 45.0 to about 50.0 weight percent n-propyl bromide; from about 0.01 to about 2.0 weight percent of a lubricant; and from 45.0 to about 50.0 weight percent of a fluorinated chemical. In other aspects, the present invention is directed to methods for cooling and lubricating a tool/workpiece interface. The methods comprise the steps of applying an effective amount of the n-propyl bromide-based machining formulations as disclosed herein to a part during a machining operation so as to cool and lubricate the tool/workpiece interface.

32 Claims, 3 Drawing Sheets

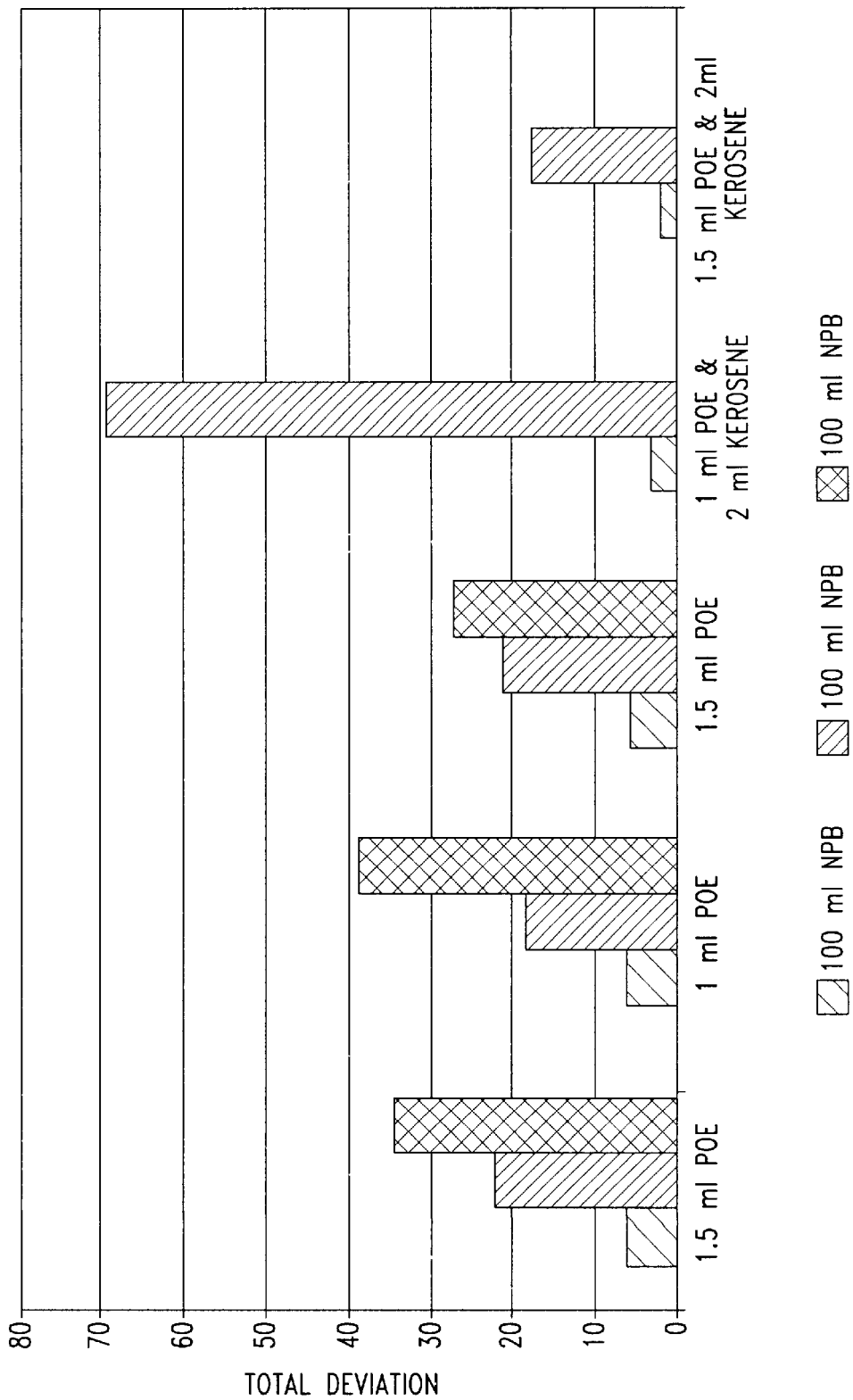

EVAPORATIVE N-PROPYL BROMIDE-BASED MACHINING FLUID FORMULATIONS

TECHNICAL FIELD

The present invention is generally directed to machining fluid formulations and, more specifically, to machining fluid formulations comprising an admixture of n-propyl bromide base solvent together with a dissolved or dispersed lubricant, and optionally together with a fluorinated hydrocarbon, as well as to methods of using the same.

BACKGROUND OF THE INVENTION

Modern metal working and forming processes normally require the use of cutting and grinding fluids whose function is to facilitate machining operations by cooling and lubricating the workpiece. In machining operations where only lubrication is necessary. lube oils are generally used. When lubrication and cooling are required, lube oil-in-water emulsions are generally used. The cooling function is accomplished by the ability of the fluid to carry off heat generated by frictional contact between the tool and the workpiece. Cooling aids tool life, preserves tool hardness and helps to maintain the dimensions of the machined parts. Cutting and grinding fluids also serve to carry away debris from the work area. With respect to straight lube oils and lube oil-in-water emulsions, they both conventionally contain additives such as stabilizers, biocides, defoamants, corrosion inhibitors, extreme pressure active materials, metal cleaners, and the like.

Over the years, developments with respect to cutting and grinding fluids (collectively referred to herein as machining fluids) have been numerous. Machining fluid technology has expanded to include the formulation and use of mineral, vegetable, and fatty oils to impart an extended range of desirable properties—corrosion protection, resistance to bacterial attack, improved lubricity, greater chemical stability, improved emulsibility, and the like. In more recent years, water-soluble fluids and fluids comprised of chemicals in water solution have replaced many traditional oil-based fluids in many different applications. This trend has been spurred by, among other things, dwindling oil supplies and rising costs for petroleum products. Increased costs to clean workpieces and rising costs of machining fluid disposal have also fueled development and use of synthetic water-based fluids.

Increasingly significant in the formulation of machining fluids is a confusing array of government regulations (federal, state, and local) pertaining to solvent emissions and waste disposal. The composition and use of machining fluids is now more than ever directly impacted by human safety considerations, air and water pollution regulations, chemical toxicity registration, waste disposal regulations, shipping regulations, energy policy, et cetera. The machining fluid selection process is further complicated by the fact that the machining fluid is only one component in an integrated metal-fabrication system.

Significantly, chlorofluorocarbons (CFCs), generally formulated with a lubricant, have for the last 30 years also been used in various machining operations.

Advantages of CFC solvent-based fluids over traditional oils and water/lubricant blends include their non-flammability and cleanliness. In general, CFC solvents evaporate completely and rapidly, thereby limiting the area of runoff and lubricant deposition.

Additionally, using CFC-based fluids on large parts with difficult-to-reach areas having stringent cleanliness requirements, such as aircraft wings, generally saves many man-hours of cleaning time. CFC-based fluids are also nonflammable, another desirable characteristic in work areas where heat and sparks may be generated.

Currently, there is a need to find replacements for CFC-based machining fluids, they are no longer being manufactured because of the Montreal Protocol and its attendant amendments which limit the use and production of certain ozone depleting chemicals. Thus, environmental concerns require that replacement machining fluids have low ozone depletion potentials, low global warming potentials, and short atmospheric lives; whereas workplace and machining concerns require that they have low toxicities, high flash-points (or be non-flammable), non-corrosive characteristics towards a variety of metals, high heat-of-vaporization values (able to remove heat quickly), and are be able to dissolve (or otherwise disperse a lubricant) and evaporate quickly so as to leave behind little or no non-volatile residue (NVR).

Although significant progress has been made with respect to machining fluid formulations, there is still a need in the art for improved machining fluid formulations that further alleviate environmental and worker safety concerns, especially within the context of finding a replacement machining fluid for CFC-based solvents. The present invention fulfills these needs and provides for further related advantages.

SUMMARY OF THE INVENTION

In brief, the present invention is directed to a machining fluid admixture for cooling and lubricating a workpiece/tool interface, wherein the admixture comprises a major amount of n-propyl bromide and a minor amount of a lubricant. In other embodiments, the machining fluid consists essentially of about 30.0 to about 99.99 weight percent n-propyl bromide; from about 0.01 to about 30.0 weight percent of a lubricant; and optionally from 0.0 to about 70.0 weight percent of a fluorinated chemical. In still further embodiments, the machining fluid consists essentially of about 45.0 to about 50.0 weight percent n-propyl bromide; from about 0.01 to about 2.0 weight percent of a lubricant; and from 45.0 to about 50.0 weight percent of a fluorinated chemical. In other aspects, the present invention is directed to methods for cooling and lubricating a tool/workpiece interface. The methods comprise the steps of applying an effective amount of the n-propyl bromide-based machining formulations as disclosed herein to a part during a machining operation so as to cool and lubricate the tool/workpiece interface.

The lubricant component of the inventive machining fluids may be a mineral oil, a synthetic lubricating oil, or a mixture thereof. The synthetic lubricating oils may or may not have a halogen constituent, and may be selected from a polyol ester, a polyalkylene glycol, a glycol ether, an isoparaffin, or mixture thereof. The polyalkylene glycol may be ethylene glycol monobutyl ether, propylene glycol methyl ether, or a mixture thereof; the isoparaffin may be 2,2,4-trimethylpentane.

The fluorinated chemical component of the inventive machining fluids may have the formula of $C_aF_bH_cN_dO_e$ wherein $2 \leq a \leq 8, 5 \leq b \leq 18, 0 \leq c \leq 13, 0 \leq d \leq 2$ and $0 \leq e \leq 2$.; the fluorinated chemical may be 1,1,1,2,3.4,4,5,5,5-decafluoropentane, 1-methoxy-nonafluorobutane, or a mixture thereof.

BRIEF DESCRIPTION OF THE DRAWINGS

FIG. 2B shows a bar graph of lubricant test data comparisons wherein 50/50 n-propyl bromide/fluorinated chemical samples were admixed with varying amounts of different lubricants, and wherein drilling was 0.621 in. diameter by 1.5 in deep in 7050 aluminum with 950 RPM at 0.002 feed.

DETAILED DESCRIPTION OF THE INVENTION

Figure 1:
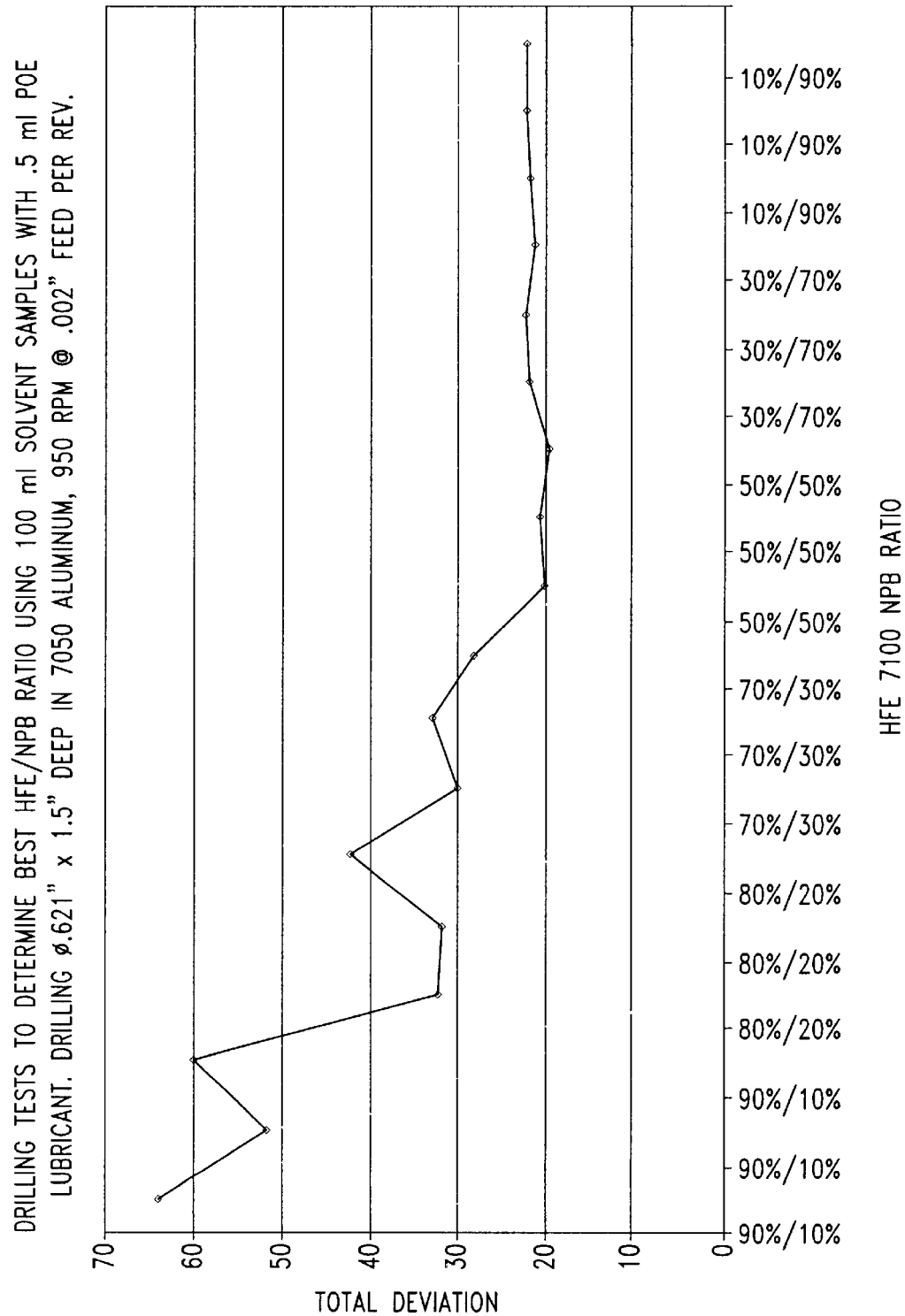
FIG. 1 shows a graph of drilling test data used to determine preferred 1-methoxy-nonafluorobutane/n-propyl bromide admixtures wherein 100 ml samples of the admixture was mixed with 0.5 ml of polyol ester lubricant, and wherein drilling was 0.621 in. diameter by 1.5 in deep in 7050 aluminum with 950 RPM at 0.002 feed.

As noted above, the present invention is generally directed to machining fluid formulations and, more specifically, to machining fluid formulations comprising an admixture of n-propyl bromide base solvent together with a lubricant, and optionally together with a fluorinated hydrocarbon as well as to methods of using the same. With respect to this disclosure, it is to be understood that although many specific details of certain embodiments of the present invention are set forth below and in the accompanying examples, the present invention may have additional embodiments, and the present invention may be practiced without several of the details described herein. Therefore, the described embodiments are to be considered in all respects only as illustrative and not restrictive.

For purposes of clarity and to facilitate a more complete understanding of the full scope of the present invention, a brief review of the nomenclature associated with machining operations is provided below. As is appreciated by those skilled in the art, machining operations is a broad term that is inclusive of all metal cutting and grinding operations in which a tool operates on a workpiece in a mechanical shaping or working process. When properly applied to the workpiece/tool interface, machining fluids significantly increase productivity and reduce costs by making possible the use of higher cutting speeds, higher feed rates, and greater depths of cut. The effective application of machining fluids also lengthens tool life, decreases workpiece surface roughness, increases dimensional accuracy, and decreases the amount of energy consumed as compared to dry machining.

Thus, and depending on the machining operation being performed (e.g., cutting versus grinding), a machining fluid typically has one or more of the following functions: cooling the tool, workpiece, and resulting grinds/chips; lubricating by reducing friction and minimizing erosion on the tool; flushing chips and swarf away from the tool; controlling "built-up edge" (BUE) on the tool; and protecting the workpiece and tool from corrosion. The relative importance of each of these functions depends on the workpiece material, the finish requirements of the final part, the machining conditions, as well as the nature of the cutting or grinding tool. Although the term machining fluid is inclusive of both, the primary difference between the functions of grinding and cutting fluids is that cooling and flushing is relatively more important in grinding than in cutting. In metal cutting, most of the heat generated during the cutting operation is carried away in the chip, whereas relatively less heat is generated in the workpiece and the tool. In the case of grinding, on the other hand. most of the heat is retained in the workpiece, and significant amounts of swarf tends to accumulate. Therefore, cooling and flushing becomes generally more important for grinding operations than for cutting operations.

In view of the foregoing and in one embodiment, the present invention is directed to a machining fluid admixture for cooling and lubricating a workpiece/tool interface, wherein the machining fluid admixture comprises n-propyl bromide and a lubricant. In other embodiments, the present invention is directed to compositions of n-propyl bromide, a lubricant, and a fluorinated chemical. Such inventive n-propyl bromide-based machining fluids have been surprisingly discovered to be very effective replacements for many existing CFC-based machining fluids currently available. In particular, it has been surprisingly discovered that machining fluid formulations comprising a major amount of n-propyl bromide admixed together with a suitable lubricant, and optionally a fluorinated chemical such a hydrofluorocarbon and/or a hydroflouroether, works remarkably well for cooling and lubricating workpiece/tool interfaces during a machining operation; and afterwards such formulations are then able to evaporate quickly so as to leave behind little or no non-volatile residue (NVR). Thus, the present invention provides for very effective replacement machining fluids for many of the now banished CFC-based solvents.

As used within the context of the present invention the term "admixture" includes mixtures of the recited components, as well as reaction products that may result from such mixing (together with, or without, other constituents) of the recited components. Likewise, the term "lubricant" refers to those hydrocarbon-based compounds, and various mixtures thereof, that are capable of reducing frictional forces between the tool and workpiece during a machining operation. Accordingly, the term lubricant includes a wide variety of organic compounds/formulations having lubricating viscosity at standard conditions and are capable of reducing frictional forces; such organic compounds/formulations may be naturally occurring substances or compounds, mixtures of naturally occurring substances or compounds, synthetic organic compounds, mixtures of synthetic organic compounds, or mixtures of naturally occurring substances or compounds and synthetic organic compounds. In general, the organic compounds/formulations of the present invention are naturally occurring or synthetic oils of lubricating viscosity. However the organic compounds/formulations may be somewhat viscous such as, for example, a grease. Accordingly, the organic compounds/formulations of the present invention include, but are not limited to, water insoluble solvent refined or acid refined mineral oils of the paraffinic, naphthenic or mixed paraffinic and naphthenic types, oils derived from coal or shale, petroleum based oils such as products containing naphtha and/or kerosene, sulfurized oils, chlorosulfurized oils, chlorinated oils, vegetable oils including, but not limited to, caster oil, soybean oil, cottonseed oil, palm oil, sunflower oil and rapeseed oil, animal oils, polyolefins, fatty acid esters or amides, polymerized unsaturated $C_{12}$ to $C_{36}$ fatty acid amides and esters of polymerized unsaturated fatty acids.

Synthetic lubricating oils useful in this invention may include, for example, water insoluble hydrocarbon oils and halo-substituted hydrocarbon oils such as polymerized and interpolymerized olefins (e.g., polybutylenes, polypropylenes, propylene-isobutylene copolymers, chlorinated polybutylenes, etc.); alkyl benzenes (e.g., dodecylbenzenes, tetradecylbenzene, dinonylbenzenes, di- (2-ethylhexyl)benzenes, etc.); polyphenyls (e.g., biphenyls, terphenyls, etc.); and the like. Water insoluble alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1,000, diphenyl ether of polyethylene glycol having a molecular weight of 500–1,000, diethyl ether of polypropylene glycol having a molecular weight of 1,00014 1,500, ethylene glycol monobutyl ethers, propylene glycol methyl ethers, etc.) or mono- and polycarboxylic ester thereof, for example, the acetic acid esters, mixed $C_3$ to $C_8$ fatty acid esters, or the $C_{13}$ oxo acid diester of tetraethylene glycol.

Another suitable class of synthetic lubricating oils useful in the practice of the present invention comprises the water insoluble esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethyhexyl alcohol, pentaerythritol. etc.). Specific examples of these esters include dibutyl adipate, di(2-ethylhexyl)-sebacate, d-in-hexyl fumarate, dioctyl sebacate, di-isooctyl azelate, diisodecyl sebacate, the 2-ethylhexyl diester of linoleic acid dimer, the complex ester formed by reacting one mole of sebacic acid with two moles of tetraethylene glycol and two moles of 2-ethylhexanoic acid, and the like.

Silicon-based oils such as the polyalkyl-, polyaryl-, polyalkoxy-, or polyaryloxysiloxane oils and silicate oils comprise another useful class of synthetic lubricants usefull in the practice of the present invention (e.g., tetracthyl-silicate, tetraisopropyl-silicate, tetra-(2-ethylhexyl)-silicate, tetra-(4-methyl-2-tetraethyl)silicate, tetra-(p-tertbutylphenyl) silicate, hexyl-(4-methyl-2-pentoxyl)-disoloxane, poly(methyl)-siloxanes, poly(methyl-phenyl)-siloxanes, etc.). Other synthetic lubricating oils usable in this invention include liquid water insoluble esters of phos-phorous containing acids (e.g., tricresyl phosphate, trioctyl phosphate di-ethyl ester of decane phosphonic acid, etc.), polymeric tetra-hydrofurans, and the like. Likewise, sulfu-rized esters of an unsaturated aliphatic carboxylic acid are also useful as the lubricant component.

The sulfurized unsaturated esters of aliphatic carboxylic acids useful as the lubricant component in accordance with the practice of the present invention include the full and partial esters of mono, di and tri hydric alcohols (e.g., ethanol, ethylene glycol and glycerol). Examples of sulfur-ized unsaturated esters of aliphatic carboxylic acids include, but are not limited to, sulfurized methyloleate, sulfurized hexyl sorbate, sulfurized dodecyllinolenate, and sulfurized ethylene dilinoleate, 1,6 hexylene diricinoleate, glycerine tripaimitoleate, polyoxyethylene dioleate, polyoxypropy-lene disorbate and glycerine dilinoleate. The sulfurized ester of an unsaturated aliphatic carboxylic acid employed in the practice of the present invention may be sulfurized fat or a sulfurized fatty oil, and the fat or fatty oil which has been sulfurized may be of animal or vegetable origin. Examples of such sulfurized fatty materials include, but are not limited to, sulfurized tallow, sulfurized palm oil, sulfurized coconut oil, sulfurized rapeseed oil, sulfurized lard oil and sulfurized castor oil.

The sulfurized polymerized unsaturated fatty acid amides and esters thereof useful as the lubricant component in accordance with the practice of the present invention may be generally derivatives of sulfurized polymerized unsaturated fatty acids that are prepared from polymerized unsaturated fatty acids obtained by polymerizing ethylenically unsatur-ated fatty acids having from 12 to 36 carbon atoms.

Generally, the polymerized unsaturated fatty acid contains from 2 to 4 monomeric units, 2 to 4 carboxylic acid groups and residual ethylenic unsaturation. The polymerization of ethylenically unsaturated fatty acids is known in the art and such acids and the methods for polymerization have been described in the art. Dimer, trimer and tetramer acids pre-pared from ethylenically unsaturated fatty acids are com-mercially available.

The polymerized ethylenically unsaturated fatty acid may contain a mixture of ethylenically unsaturated fatty acid, dimer acid, trimer acid and tetramer acid in varying propor-tions depending upon the starting ethylenically unsaturated fatty acid and the conditions under which the polymerization was carried out. Sulfurization of the polymerized unsatur-ated fatty acid may be achieved by methods well known in the art. Esters of polymerized unsaturated acids that may be sulfurized to produce the lubricant useful in the practice of the present invention include, but are not limited to, mono methyl ester of dimerized linoleic acid, mono polyoxyalky-lene (e.g., polyoxyethylene) glycol ester of dimerized linoleic acid, acid terminated polyoxyalkylene (e.g., polyoxyethylene) glycol diester of dimerized linoleic acid, and alcohol terminated polyoxyalkylene (e.g., polyoxypro-pylene oxyethylene) glycol polyester of dimerized linoleic acid. Examples of sulfurized polymerized unsaturated fatty acids for preparing amide and ester derivatives include, but are not limited to, sulfurized polymerized oleic acid, sulfu-rized polymerized linoleic acid, sulfurized polymerized lau-roleic acid, sulfurized polymerized vaccenic acid, sulfurized polymerized eleostearic acid and sulfurized polymerized linolenic acid.

Examples of sulfurized hydrocarbons useful as the lubri-cant component in accordance with the practice of the present invention include, but are not limited to, sulfurized olefin, olefin sulfides, aliphatic hydrocarbon sulfides (e.g., $R^5$—S—$R^6$ where $R^5$ is alkyl of 1 to 20 carbons and $R^6$ is alkyl of 3 to 20 carbons) and sulfurized polyolefin, particu-larly sulfurized low molecular weight polyolefins.

In the practice of the present invention the lubricant component of the machining fluid admixture may vary in amount over a wide range. Typically, the lubricant compo-nent of the n-propyl bromide/lubricant admixture ranges from about 0.01% to about 30%, preferably from about 0.01% to about 10%, and more preferably from about 1.0% to about 3.0%, by weight based on the total machining fluid composition.

As noted above, in other embodiments the n-propyl bromide/lubricant admixture includes a fluorinated chemical component such as, for example, hydrofluorocarbons (HFCs) and/or hydrofluoroethers (HFEs). Preferably, the fluorinated chemical has the formula of $C_aF_bH_cN_dO_e$ wherein $2 \leq a \leq 8$, $5 \leq b \leq 18$, $0 \leq c \leq 13$, $0 \leq d \leq 2$ and $0 \leq e \leq 2$. Thus, fluorinated chemicals useful in the present invention include perfluorinated chemicals such as perfluoroalkanes, perfluorocycloalkanes, perfluoroethers, perfluorocycloethers, perfluorocycloaminoethers and the like, as well as partially fluorinated hydrocarbons such as hydrofluoroethers. The partially fluorinated hydrocarbons preferably contain a fluorine:hydrogen atom ratio of at least about 1:1, and more preferably of at least about 2:1. Among the preferred perfluorinated chemicals are straight chain fluorocarbons containing only carbon and fluorine atoms, such as perfluoro-n-pentane, perfluoro-n-hexane, perfluoro-n-heptane and perfluoro-n-octane. The preferred fluorinated chemicals in the practice of the present invention include 1,1,1,2,3,4,4,5,5,5-decafluoropentane (available from E.I. Dupont de Nemours and Company, U.S.A under the tradename VERTREL XF), 1-methoxy-nonafluorobutane (available from Minnesota Mining and Manufacturing Company, U.S.A. under the tradename HFE-7100), or a mixture thereof. With respect to 1-methoxy-nonafluorobutane, it is to be understood that this fluorinated chemical generally consists of two inseparable isomers with essentially identical properties;

namely, $(CF_3)_2CFCF_2OCH_3$ and $CF_3CF_2CF_2CF_2OCH_3$.

As with the lubricant component, the fluorinated chemical component of the machining fluid formulation may also vary over a wide range. Typically, the fluorinated hydrocarbon component of the n-propyl bromide/lubricant admixture ranges from about 0.0% to about 70%, preferably from about 25% to about 60%, and more preferably from about 45% to about 55%, by weight based on the total machining fluid composition.

In other aspects, the present invention is directed to methods for cooling and lubricating a tool/workpiece interface. The methods comprise the steps of applying an effective amount of the n-propyl bromide-based machining formulations as disclosed herein to a part during, a machining operation so as to cool and lubricate the tool/workpiece interface.

For purposes of illustration and not limitation, the following examples more specifically disclose various aspects of the present invention.

EXAMPLES

In order to demonstrate the effectiveness of machining fluid formulations comprising an admixture of n-propyl bromide base solvent together with a lubricant (and optionally with a fluorinated chemical component) in accordance with the present invention, several drilling tests were conducted. More specifically, several drilling tests that simulated exemplary machining conditions associated with the aerospace industry were conducted using portable, air-powered drill motors called "Quackenbush drills." These motors allow the rotational speed of the drill bit (i.e., revolutions per minute or "RPM"), as well as the drill bit's feed rate (i.e., distance drill bit advances, expressed as thousandths of an inch per revolution or "IPR," into workpiece during each revolution) to be precisely adjusted. In the several tests, the drill bits used were standard high-speed steel having internal channels for transporting the machining fluid to the cutting edges of the drill bit's tip. (Note that the machining industry refers to this type of fluid delivery system as "through-the-tool" as opposed to "flood" or "spray".) The machining fluid supply was housed in a pressure pot and forced to the point of cut by compressed air.

The Quackenbush drillmotor is equipped with a "nosepiece" and "foot" for attaching the motor to a drilling jig, and aligning it perpendicular to the surface being drilled. The nosepiece is actually a drill bushing extending out from the attachment foot. It is inserted into a guide hole in the drill jig until the foot contacts the jig. The motor is then rotated a quarter turn, forcing a wedge shaped flange at the base of the foot to slide under an attachment lobe fastened to the jig. This action, similar to tightening a lid on a jar, securely attaches the drill motor to the jig at right angles to the work.

The workpieces consisted of metal coupons measuring 6" wide, ¼"–1½" thick, and 24" long. The coupons were clamped to a movable fixture parallel to the drill jig. After each hole was drilled, the fixture was moved to the next position.

Coupons consisted of 2024 aluminum (soft & gummy), 7075 aluminum (hard), and 6AL4V titanium (very hard & tough). In some cases, several coupons were sandwiched together to simulate the arrangement of aircraft parts to be drilled. In general, it is generally difficult to control hole quality in such metal sandwiches in that hard chips exit back through the drill flutes and past the soft aluminum. Unless the machining fluid provides adequate lubrication, the chips tend to score the soft aluminum. Coupons were also drilled in a variety of positions to simulate shop floor situations: horizontal, vertical-up, and vertical-down. The vertical positions have special advantages and problems; for example, vertical-up holes lose fluid faster but chips clear the hole quickly, whereas vertical-down drilling does not lose fluid prematurely, but chips can bunch-up in the flutes more easily and score the hole. In either case, sufficient lubricant must remain in the hole and on the tool so as to prevent the flutes from rubbing the sides of the hole, causing it to go oversize, and the fluid must keep the chips lubricated so they flush from the hole without scoring its surface.

Exemplary machining fluid admixtures in accordance with the present invention were prepared in which a commercial grade of n-propyl bromide (NPB) (Great Lakes Chemical Corp, U.S.A.) was used as the base solvent. When the NPB was combined with small amounts of dissolved or otherwise dispersed lubricant, the inventive machining fluid was found to provide sufficient cooling and lubrication so as to produce holes that meet commercial aircraft standards. NPB's role however goes beyond acting as a lubricant vehicle—its physical characteristics provide many other benefits such as rapid evaporation under standard conditions.

In this regard, a primary benefit of using evaporative machining fluids like those of the present invention is the relative cleanliness of the operation. In contrast, conventional machining fluids such as oil or water/lubricant blends are capable of making high quality cuts in metal, however, the part must normally be put through a cleaning process afterward. If the same quality machining can be performed with an evaporative fluid and no cleaning is required afterward, the savings in labor can more than offset the higher cost for the evaporative machining fluid.

Although many solvents are known to exist which would evaporate after use, and which would provide adequate cooling and lubrication during a cut, these solvents by themselves, however, would generally create a fire hazard that could not be tolerated in an open workplace. NPB is not only nonflammable, it also suppresses the flammability of many fluids blended with it (thereby allowing the addition of small amounts of flammable hydrocarbons having a relatively high vapor pressure). Such additives may then be able to evaporate at a rate similar to that of NPB and leave a low NVR.

NPB's high heat-of-vaporization allows it to remove heat from the drill, workpiece, and chips as a cut is being made. This cooling action improves hole finish and allows faster RPMs and more aggressive feed rates. During testing it was observed that tools did not develop a "built-up-edge" (BUE). This is a chronic problem when drilling metal (e.g., aluminum or titanium) and it occurs when small metal particles weld to the surfaces of the drill bit contacting the workpiece. BUE will change the diameter of the drill bit when it occurs on the margins, eventually causing the drill bit to create an oversized hole. Although the mechanism has not been determined, drill margins remained free of BUE while testing the NPB admixtures disclosed herein (which greatly extended tool life).

All of the lubricants tested with NPB formed stable solutions when dissolved into the solvent. The solvency was reduced, however, when NPB was combined with either a hydroflourocarbon (HFC) or a hydroflouroether (HFE). In general, the more viscous the additive, the less likely it was to stay in solution if either HFC or HFE were part of the admixture. These solvents were included in the majority of drill tests because their physical characteristics are similar to NPB, and because they reduce the overall toxicity of the final formula. In some work environments, such as aircraft assembly plants, the concentration of solvent vapor could exceed 100 PPM in the workplace if problems occur with ventilation. Because of their higher PELs (200 PPM and 700 PPM, respectively) the overall toxicity of the fluid was reduced when either HFC or HFE was included in significant proportions.

Testing was done in a number of phases. First, a basic lubricant package was developed that, when combined with NPB, produced good holes in aluminum drilling tests. NPB was then combined with HFE or HFC in varying ratios, mixed with the minimal amount of lubricant needed for drilling, and drill tests were conducted to determine an optimal solvent/solvent ratio. It was found that when NPB was less than 30% of the total mixture by weight, hole quality was significantly reduced. No significant improvement was observed in hole quality when the ratio of NPB exceeded 60% of the total combined solvent mixture. A standard solvent ratio of about 50% NPB and about 50% of either HFC or HFE was then used in combination with a variety of lubricants. These lubricants included: ethylene glycol monobutyl ether, propylene glycol methyl ether, polyol ester, "Boelube" (proprietary formula, based on long-chain alcohol, belonging to The Boeing Company), "Mayphos 45" (Proprietary formula, using phosphorous as a barrier lubricant, belonging to Castrol), "Ilocut 7425" (Castrol product consisting of Naphtha), kerosene, "Isopar" solvents (series of high-purity hydrocarbon solvents from Exxon).

Good quality holes were produced with all of the tested lubricants in combination with NPB/HFE or NPB/HFC, but the most suitable lubricant for aircraft assembly was seemingly Isopar C. This lubricant appeared to work the best because it evaporated at a rate similar to the base solvents and it left behind very little NVR. The effectiveness of the several machining fluid formulations tested are more fully exemplified in the context of the following test data:

Drilling Test Data and Summary

Figure 2A:
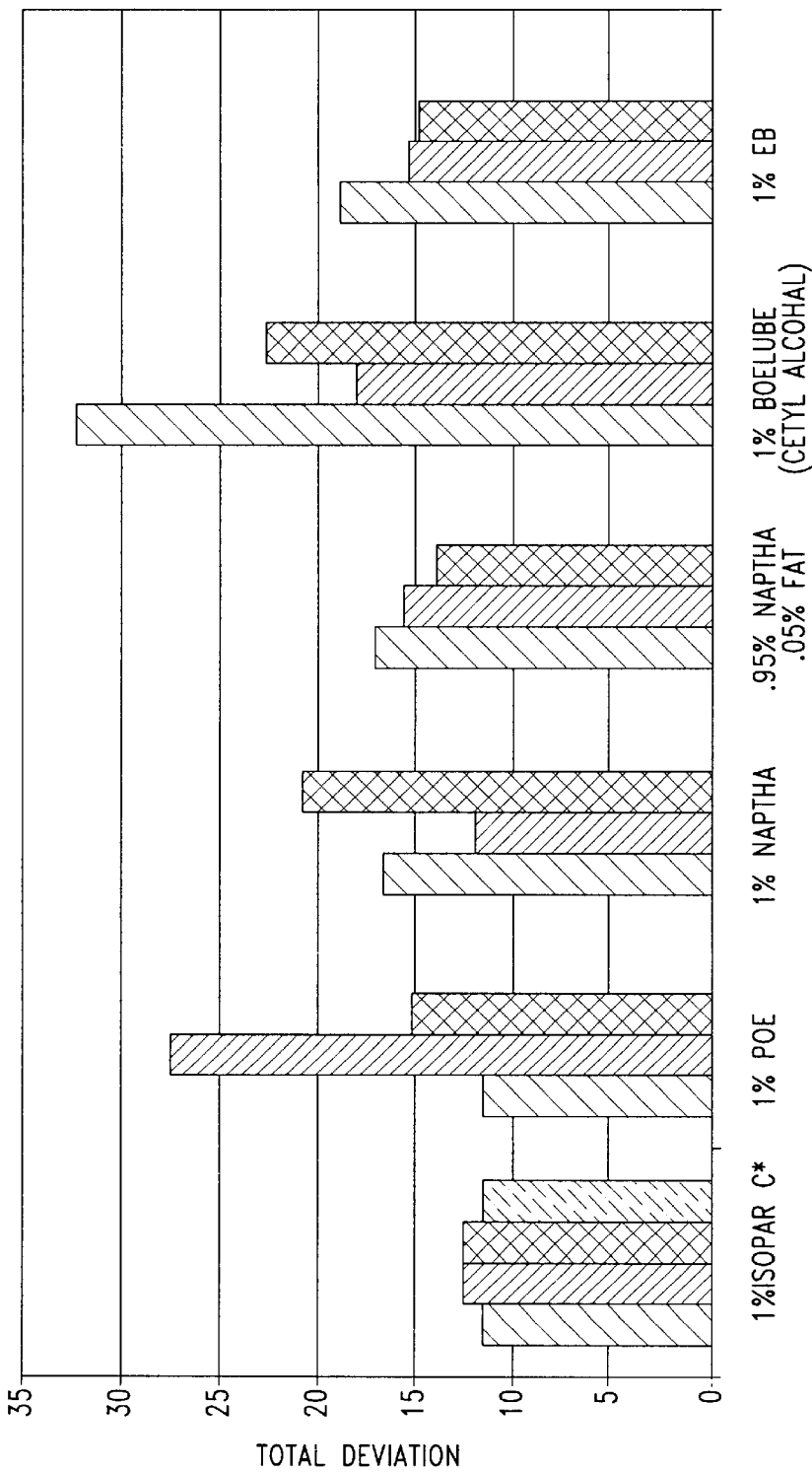
FIG. 2A shows a bar graph of lubricant test data comparisons wherein 50/50 n-propyl bromide/fluorinated chemical samples were admixed with varying amounts of different lubricants, and wherein drilling was 0.621 in. diameter by 1.5 in deep in 7050 aluminum with 950 RPM at 0.002 feed.

Drilling tests were conducted using various formulas of evaporative machining fluid. The tests were conducted in a machining laboratory and simulated the drilling procedures used during commercial aircraft assembly. The holes were then evaluated by Boeing engineers in accordance with standards required by the Boeing Aircraft Company. The most important criteria in determining effectiveness of the various formulas were the actual dimensions of the holes in relation to the drill size, and surface finish inside the hole. Holes whose surface finish or diameter requirements failed to meet Boeing specifications were rejected automatically. Because hole quality was effected by the drill or drill motor being used, and only one drill and drillmotor were used during a day's test series, holes from one test series were not compared to holes from another test series. Each hole was measured for its smallest and largest diameters at three positions: the hole's entrance, its middle, and its exit. The quality of the holes depended on the consistency of the diameters and how closely the hole conformed to the diameter of the drill. Diameter consistency is expressed in FIGS. 1 and 2A-B as "Total Deviation." In general, the greater the differences in diameters, the greater the total deviation; hence, holes with the lowest total deviation within a test series were judged to be "best."

More specifically, two values were determined by evaluating the hole diameter data: (1) greatest deviation within any given hole, and (2) deviation of a hole's largest diameter from the smallest diameter within a given test series. In both cases the deviations were expressed as 1=0.0001 and were added together to determine the "Total Deviation" value for each test hole. As a result of these tests, it was discovered that drills using NPB-based machining fluid formulations in accordance with the present invention developed almost no "built up edge", or BUE, while drilling aluminum or titanium. It was also found that holes could be drilled more aggressively with NPB and Isopar C or a blend of lubricants (not exceeding 2% lubricant) than with the soluble oil cutting fluid or the long-chain cetyl alcohol called "Boelube" which Boeing uses as its standard cutting fluids in similar operations. Speed and feed were increased from 950 RPM @ 0.002" feed per revolution to 1250 RPM @ 0.004 feed per revolution, increasing productivity by 132%.

While the machining fluid formulations of the present invention have been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A method for cooling and lubricating a tool/workpiece interface, the method comprising applying an effective amount of a machining fluid admixture, the admixture comprising a major amount of n-propyl bromide and a minor amount of a lubricant.

2. The method of claim 1 wherein the lubricant is in an amount that ranges from about 0.01% to about 30%, by weight, of the machining fluid admixture.

3. The method of claim 1 wherein the lubricant is in an amount that ranges from about 0.01% to about 10%, by weight, of the machining fluid admixture.

4. The method of claim 1 wherein the lubricant is in an amount that ranges from about 1.0% to about 3.0%, by weight, of the machining fluid admixture.

5. The method of claim 1 wherein the lubricant is a mineral oil, a synthetic lubricating oil, or a mixture thereof.

6. The method of claim 1 wherein the lubricant is a synthetic lubricating oil.

7. The method of claim 6 wherein the synthetic lubricating oil is a non-halogenated synthetic lubricating oil.

8. The method of claim 6 wherein the synthetic lubricating oil is a polyol ester, a polyalkylene glycol, a glycol ether, an isoparaffin, or a mixture thereof.

9. The method of claim 8 wherein the polyalkylene glycol is ethylene glycol monobutyl ether, propylene glycol methyl ether, or a mixture thereof.

10. The method of claim 6 wherein the synthetic lubricating oil is an isoparaffin.

11. The method of claim 10 wherein the isoparaffin is 2,2,4-trimethylpentane.

12. The method of claim 6 wherein the synthetic lubricating oil is a polyol ester.

13. The method of claim 6 wherein the machining fluid admixture further comprises a fluorinated chemical.

14. The method of claim 13 wherein the fluorinated chemical has the formula $C_aF_bH_cN_dO_e$ wherein $2 \leq a \leq 8$, $5 \leq b \leq 18$, $0 \leq c \leq 13$, $0 \leq d \leq 2$, and $0 \leq e \leq 2$.

15. The method of claim 13 wherein the fluorinated chemical is 1,1,1,2,3,4,4,5,5,5-decafluoropentane, 1-methoxy-nonafluorobutane, or a mixture thereof.

16. A method for cooling and lubricating a tool/workpiece interface, the method comprising applying an effective amount of a machining fluid admixture, the admixture comprising:

from about 30.0% to about 99.99%, by weight, of n-propyl bromide;

from about 0.01% to about 30.0%, by weight, of a lubricant; and, optionally, from 0.0% to about 70.0%, by weight, of a fluorinated chemical.

17. The method of claim 16 wherein the lubricant is a synthetic lubricating oil.

18. The method of claim 17 wherein the synthetic lubricating oil is a non-halogenated synthetic lubricating oil.

19. The method of claim 17 wherein the synthetic lubricating oil is a polyol ester, a polyalkylene glycol, a glycol ether, an isoparaffin, or a mixture thereof.

20. The method of claim 19 wherein the polyalkylene glycol is ethylene glycol monobutyl ether, propylene glycol methyl ether, or a mixture thereof.

21. The method of claim 17 wherein the synthetic lubricating oil is an isoparaffin.

22. The method of claim 21 wherein the isoparaffin is 2,2,4-trimethylpentane.

23. The method of claim 17 wherein the synthetic lubricating oil is a polyol ester.

24. The method of claim 16 wherein the fluorinated chemical has the formula $C_aF_bH_cN_dO_e$ wherein $2 \leq a \leq 8$, $5 \leq b \leq 18$, $0 \leq c \leq 13$, $0 \leq d \leq 2$, and $0 \leq e \leq 2$.

25. The method of claim 16 wherein the fluorinated chemical is 1,1,1,2,3,4,4,5,5,5-decafluoropentane, 1-methoxy-nonafluorobutane, or a mixture thereof.

26. A method for cooling and lubricating a tool/workpiece interface, the method comprising applying an effective amount of a machining fluid admixture, the admixture comprising:

from about 45.0% to about 50.0%, by weight, of n-propyl bromide;

from about 0.01% to about 2.0%, by weight, of a lubricant; and, from 45.0% to about 50.0%, by weight, of a fluorinated chemical.

27. The method of claim 26 wherein the lubricant is a synthetic lubricating oil.

28. The method of claim 27 wherein the synthetic lubricating oil is a polyol ester, a polyalkylene glycol, a glycol ether, an isoparaffin, or a mixture thereof.

29. The method of claim 28 wherein the polyalkylene glycol is ethylene glycol monobutyl ether, propylene glycol methyl ether, or a mixture thereof.

30. The method of claim 27 wherein the synthetic lubricating oil is an isoparaffin.

31. The method of claim 30 wherein the isoparaffin is 2.2,4-trimethylpentane.

32. The method of claim 27 wherein the synthetic lubricating oil is a polyol ester.

* * * * *